US006185529B1

(12) United States Patent
Chen et al.

(10) Patent No.: US 6,185,529 B1
(45) Date of Patent: Feb. 6, 2001

(54) SPEECH RECOGNITION AIDED BY LATERAL PROFILE IMAGE

(75) Inventors: Chengjun Julian Chen, White Plains, NY (US); Frederick Yung-Fung Wu, Cos Cob, CT (US); James T. Yeh, Katonah, NY (US)

(73) Assignee: International Business Machines Corporation, Armonk, NY (US)

( * ) Notice: Under 35 U.S.C. 154(b), the term of this patent shall be extended for 0 days.

(21) Appl. No.: 09/153,219

(22) Filed: Sep. 14, 1998

(51) Int. Cl.$^7$ .................................................. G10L 15/24
(52) U.S. Cl. ........................... 704/251; 704/231; 704/270
(58) Field of Search .................................. 704/24.8, 215, 704/252, 251, 256; 382/118, 190, 159, 202, 100

(56) References Cited

U.S. PATENT DOCUMENTS

| | | | |
|---|---|---|---|
| 4,757,541 | 7/1988 | Beadles | 704/254 |
| 4,769,845 | * 9/1988 | Nakamura | 704/231 |
| 4,975,960 | * 12/1990 | Petajan | 704/251 |
| 5,286,205 | * 2/1994 | Inouye et al. | 434/107 |
| 5,586,215 | * 12/1996 | Stork et al. | 704/232 |
| 5,806,036 | * 9/1998 | Stork | 704/260 |

FOREIGN PATENT DOCUMENTS 0 254 409 * 4/1988 (GB) .............................. G10L/5/06

OTHER PUBLICATIONS

Benoit, "Synthesis and Automatic Recognition of Audio–Visual Speech", Integrated Audio–Visual Processing for Recognition, Synthesis & Communication colloquium, IEEE, Nov. 28, 1996.*

Wu, et al., "Speaker–Idependent Vowel Recognition Combining Voice Features and Mouth Shape Image With Neural Network"; Systems and Computers in Japan, vol. 22, No. 4, pp. 100–107(1991).

Silsbee, et al., "Automatic Lipreading"; Biomedical Sciences Instrumentation, v 29, pp. 415–422 (1993).

Silsbee, et al., "Audio Visual Speech Recognition For A Vowel Discrimination Task"; Proc. SPIE–Int. Soc. Opt. Eng. (USA) v 2094, pp. 84–95(1993).

Kenji Mase, et al., "Automatic Lipreading by Optical–Flow Analysis"; Systems and Computers in Japan, vol. 22, No. 6 (1991).

Lalit R. Bahl, et al; "Performance of the IBM Large Vocabulary Continuous Speech Recognition System on the ARPA Wall Street Journal Task"; Computer Science RC 19635 (87076) (1994).

* cited by examiner

*Primary Examiner*—Tālivaldis I. Šmits
*Assistant Examiner*—Daniel A. Nolan
(74) *Attorney, Agent, or Firm*—Scully, Scott, Murphy & Presser; Stephen C. Kaufman, Esq.

(57) ABSTRACT

An apparatus and a method for imaging the mouth area laterally to produce reliable measurements of mouth and lip shapes for use in assisting the speech recognition task. A video camera is arranged with a headset and a microphone to capture a lateral profile image of a speaker. The lateral profile image is then used to compute features such as lip separation, lip shape and intrusion depth parameters. The parameters are used in real time, during speech recognition process to characterize and discriminate spoken phonemes to produce a high degree of accuracy in automatic speech recognition processing, especially in a noisy environment.

27 Claims, 8 Drawing Sheets

SPEECH RECOGNITION AIDED BY LATERAL PROFILE IMAGE

DESCRIPTION

1. Technical Field

The present invention relates in general to an automatic speech recognition system, and more particularly to a system and a method for recognizing speech by analyzing lateral mouth or face images.

2. Prior Art

Automatic voice recognition by computers which can interpret voice input has been an important goal in the information processing industry. Such speech recognition simplifies person-to-computer interaction and greatly enhances machine usability. As speech-recognition technology improves, a growing number of companies, including securities companies, e.g., on their trading floors, and airlines are starting to use speech recognition technology enterprise-wide for their critical processes. However, the existing technology still has problems in accurately distinguishing the nuances of the human voice, especially amidst the clutter of noisy work environments. The existing state-of-the-art systems are only able to achieve acceptable accuracy for the prepared language uttered in a quiet environment. Therefore, it would be highly desirable to have a system and a method for recognizing natural speech more accurately, even in noisy environments.

Although the existing state-of-the-art acoustic-only speech recognition systems perform well in distinguishing vowel sounds, they are less successful at differentiating among consonant sounds. Another weakness of acoustic-only speech recognition is an inability to determine breaks between syllables, which are vital to accurate recognition. Therefore, in a speech recognition system, it would be highly desirable to provide means for acquiring types of data that best complement acoustic data, leading to affordable and reliable speech recognition.

To improve speech-recognition technology, researchers in the following publications, have shown that simultaneous video imaging of the face or mouth of the speaker can yield data that can be used together with acoustic speech recognition algorithms to improve the recognition accuracy. In J. T. Wu, S. Tamura, Mitsumoto, H. Kawai, K. Kurosu, and K. Okazaki, "Speaker-Independent Vowel Recognition Combining Voice Features and Mouth Shape Image with Neural Network," Systems and Computers in Japan, vol. 22, pp. 100–107 (1991), voice features and mouth shape images are combined and used for training error back-propagation neural networks to achieve speaker-independent vowel recognition.

P. L. Silsbee, A. C. Bovik, "Automatic Lipreading," Biomedical Sciences Instrumentation, vol. 29, pp. 415–422 (1993), describes automatic visual lipreading system intended to supplement a standard automatic speech recognizer. P. L. Silsbee, A. C. Bovik, "Audio Visual Speech Recognition for a Vowel Discrimination Task," Proc. SPIE, vol. 2094, pp. 84–95 (1993), describes a speaker dependent lipreading system using hidden Markov modeling, which may be used in conjunction with an audio automatic speech recognition system to improve the accuracy of speech recognition.

U.S. Pat. No. 4,769, 845 issued Sep. 6, 1988 to H. Nakamura, entitled "Method of Recognizing Speech Using a Lip Image," describes a speech recognition method with an image pickup apparatus for collecting lip data during speech to be used for recognizing speech. U.S. Pat. No. 4,757,541 issued Jul. 12, 1988 to R. L. Beadles, entitled "Audio Visual Speech Recognition," also describes automatic lipreading without audio input for speech recognition system.

U.S. Pat. No. 4,975,960 issued Dec. 4, 1990 to E. D. Petajan, entitled "Electronic Facial Tracking and Detection System and Method and Apparatus for Automated Speech Recognition," describes circuitry for obtaining a video image of an individual's face, and electronically locating and tracking frontal facial features such as the nostrils and mouth for use in combination with acoustics for speech recognition.

Using the front view of mouth shapes and tongue positions to recognize acoustic speech signals marginally improves the performance of the speech recognition system, in a noisy environment where ability to recognize acoustic signals may become degraded due to the background noise. However, the analysis of front images of the face or mouth itself poses a complex problem because such analysis requires significant computation. Moreover, the results attained may not have the reliability required for many applications.

SUMMARY OF THE INVENTION

The present invention is directed to an apparatus and a method for imaging the mouth area laterally to produce reliable measurements of mouth and lip shapes for use in assisting the speech recognition task. Acquisition and analysis of lateral profiles become much simpler than front view analysis of mouth and lip shapes because only a minimum set of lateral profile features is required for distinguishing syllables. Accordingly, it is an object of the present invention to provide a relatively simple apparatus and a method for acquiring lateral profiles of the mouth and lip shapes for use with acoustic data during speech recognition process.

To attain the above and other objectives of the present invention, a video camera mounted on a headphone assembly with one or more microphone(s) is arranged to generate profile images of a speaker's mouth area. A light source is included to provide illumination surrounding the mouth area. A diffuse screen is provided near the light source for diffusing the illuminated light emitted by the light source around the speaker's mouth area. A mirror, which is preferred to be flat, is also included and is situated near the video camera. The mirror generally reflects the mouth area.

From the captured profile images, a profile of a mouth is extracted and stored into a one-dimensional vector from which features such as lip separation, lip shape, and intrusion depth may be calculated. The computed features may then be used in conjunction with acoustics signals for accurate speech recognition. Particularly, the computed features may be provided as training sets to a hidden Markov model (HMM) for recognizing speech.

Further features and advantages of the present invention as well as the structure and operation of various embodiments of the present invention are described in detail below with reference to the accompanying drawings. In the drawings, like reference numbers indicate identical or functionally similar elements.

BRIEF DESCRIPTION OF THE DRAWINGS

Preferred embodiments of the present invention will now be described, by way of example only, with reference to the accompanying drawings in which.

DETAILED DESCRIPTION OF THE PREFERRED EMBODIMENT OF THE INVENTION

Figure 1:
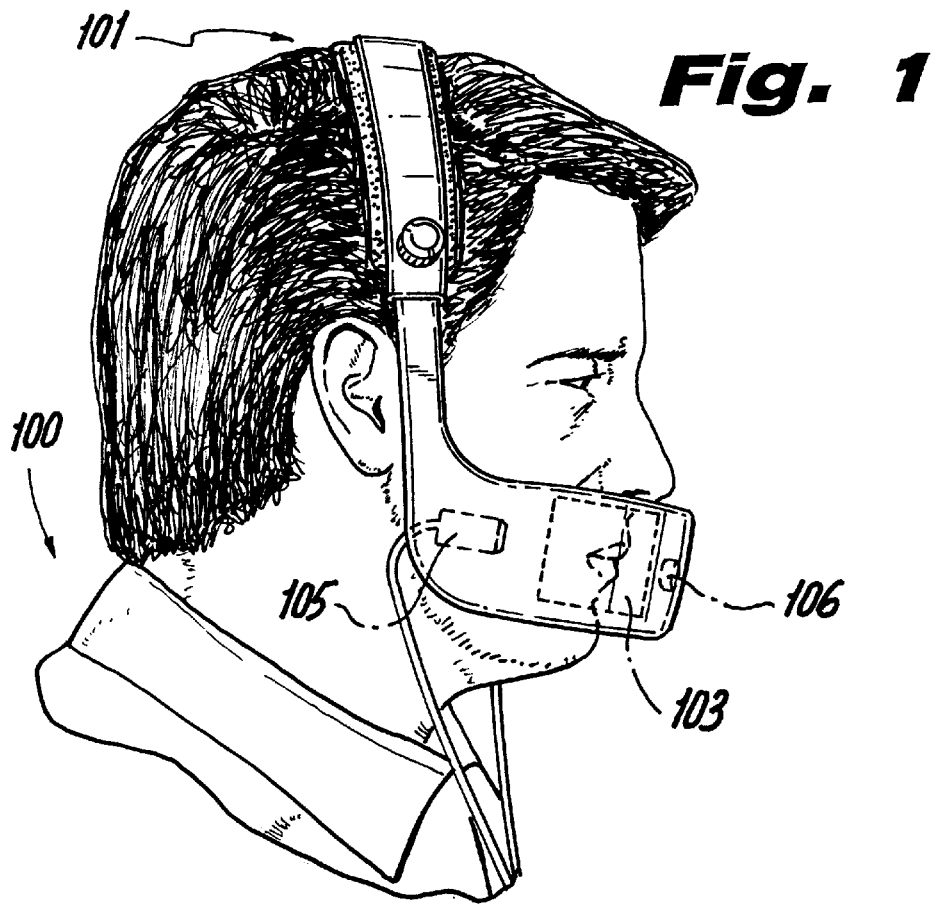
FIG. 1 is an example of an apparatus of the present invention used for obtaining profile images for use during speech recognition process.
Figure 2:
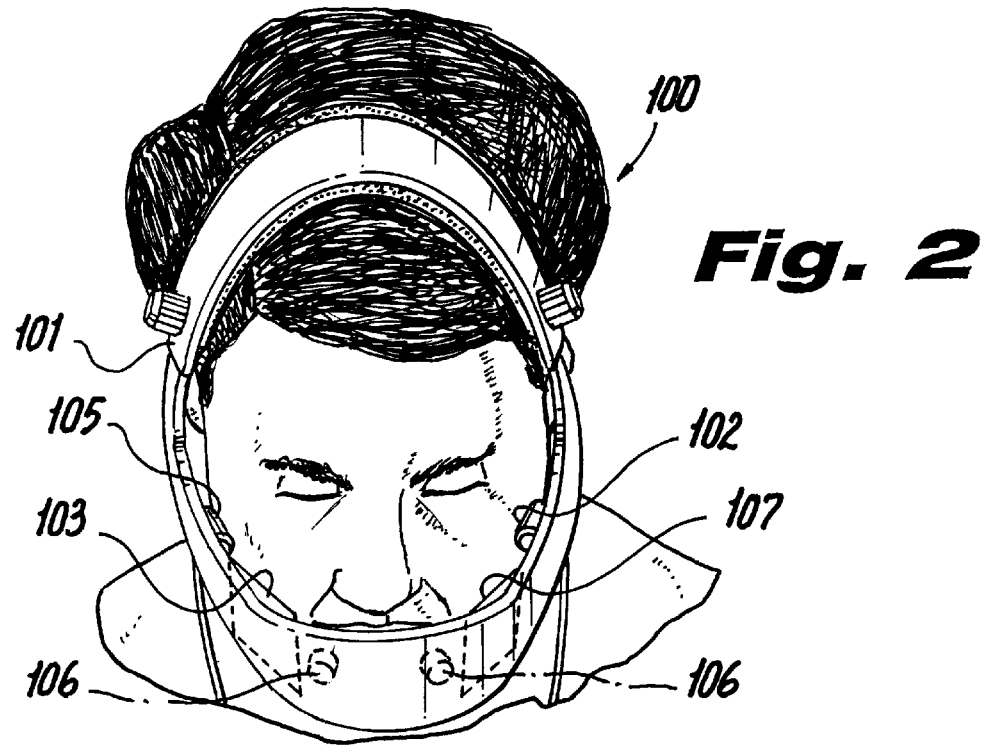
FIG. 2 illustrates a top view of speaker wearing the apparatus of the present invention.

The present invention is an apparatus and a method of acquiring facial profile data for use with an acoustic speech recognition system. FIGS. 1 (side view) and 2 (top view) illustrate a typical device for lateral profile imaging. The device may be easily mounted on a headphone assembly 101 and worn by a person 100 as shown in FIGS. 1 and 2. A person 100 using a speech recognition system typically wears a headset 101 with one or more microphone(s) 106 in front of the speaker's mouth. In a preferred embodiment, the present invention includes a mirror 103, preferably flat, located near the microphone 106 and situated in an angle, preferably at 45 degrees, to the mouth. The mirror 103 is arranged such that the reflection of the mouth profile is visible on the mirror. A miniature video camera 105, preferably an infrared CCD (Charged Coupled Device) camera, is attached to one side of the headphone assembly 101 and typically forms a profile image of the mouth region from the light reflected by the mirror. A light source 102, typically infrared, is attached to the opposite side of the headphone assembly 101. The infrared light source 102 emits continuous or pulsed lights onto a diffuse screen 107, e.g., a white paper or plastic card, but not limited to such examples. The lights emitted by the light source 102 are diffused by the diffuse screen 107, and pass through the nose-mouth area. The camera 105 captures profile images of the mouth. While the video camera scans horizontally, the pixels are set to either black or white representing light or dark. The onset time or onset position of each scan line is recorded as the video signals.

In another embodiment of the present invention, the diffuse screen 107 may be a dark screen, e.g., a black paper or plastic card, but not limited to such examples. This embodiment may be used to obtain inverse images, i.e., bright facial profiles against a dark background, and is highly useful in brightly-lighted user environments. In this embodiment, the light source 102 is mounted on the side of the headset having the video camera 105. The light source 102 may be mounted directly adjacent to the mirror 103 or directly adjacent to the camera 105. When the light source 102 is mounted directly adjacent to the camera, the flat mirror serves two purposes: to reflect illumination onto the face and to reflect the facial image onto the camera. The images shown in FIGS. 3–8 were obtained using this embodiment of the present invention.

The application of infrared light may have an advantage of invisibility, greater sensitivity, and better signal-to-noise ratio against scattered environment light. The use of an infrared camera may further reduce interference from other light sources.

For proper acquisition of images, only a minimum camera resolution is needed. For example, a 100×100 pixel monochrome camera with 1 bit digitization (on-or-off signals) would be sufficient, effectively reducing the cost of the hardware and the amount of data that must be transported and processed. The standard 50 or 60 field/sec video rates provide adequate temporal resolution to track the fastest mouth movements in normal speech. However, to synchronize with acoustic frames, 100 field/sec rate is preferred.

Typically, acoustic speech recognition systems are trained with examples of the speaker's voice. Similarly, the combined acoustic-video recognition system is trained with samples of both acoustic and video data for each speaker. For example, the speaker utters a series of specified words or sentences. The changes of mouth profile configurations with time are then recorded together with the voice. The acoustic and video data are analyzed, resulting in time sequences of a number of characteristics which are stored for later use. During a speech recognition process, the patterns of mouth movements together with the voice signals are compared with the stored reference patterns.

Figure 3:
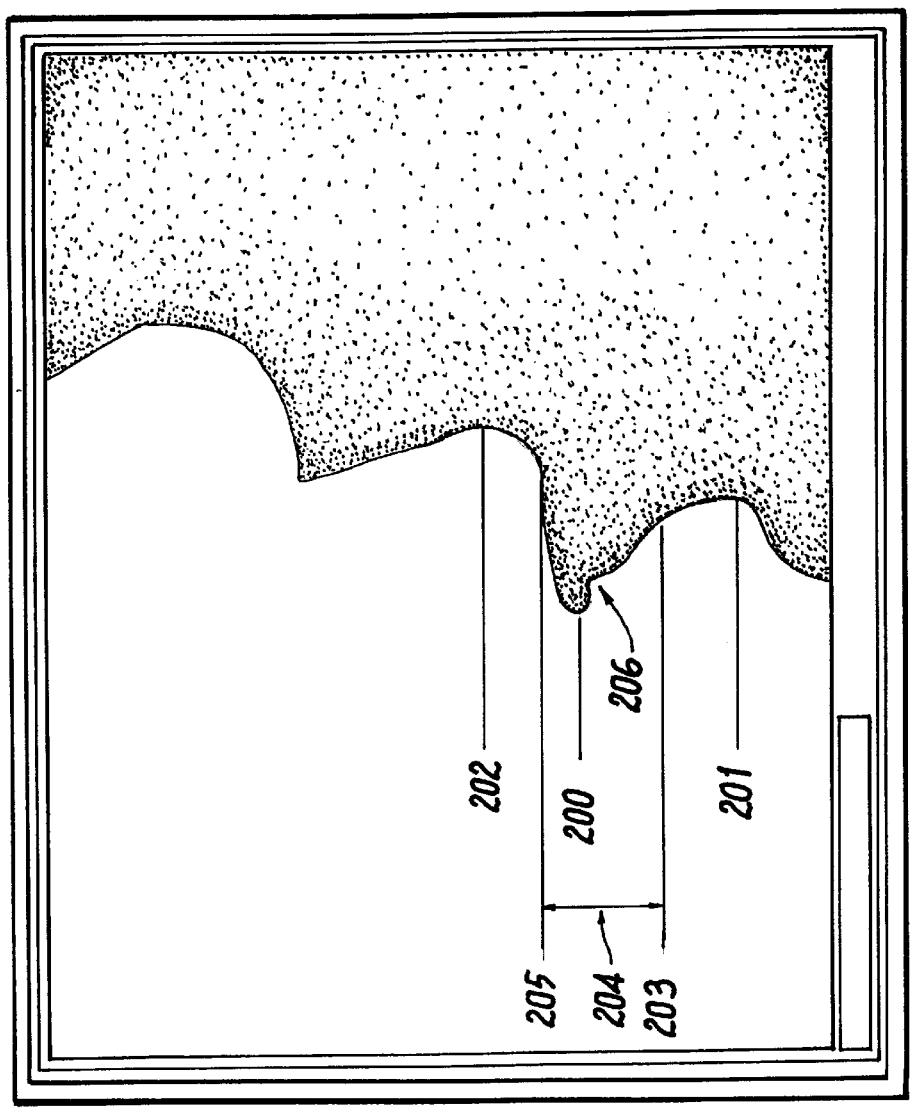
FIG. 3 illustrates an example of a profile image obtained for feature computation in the present invention for use in speech recognition process.
Figure 4:
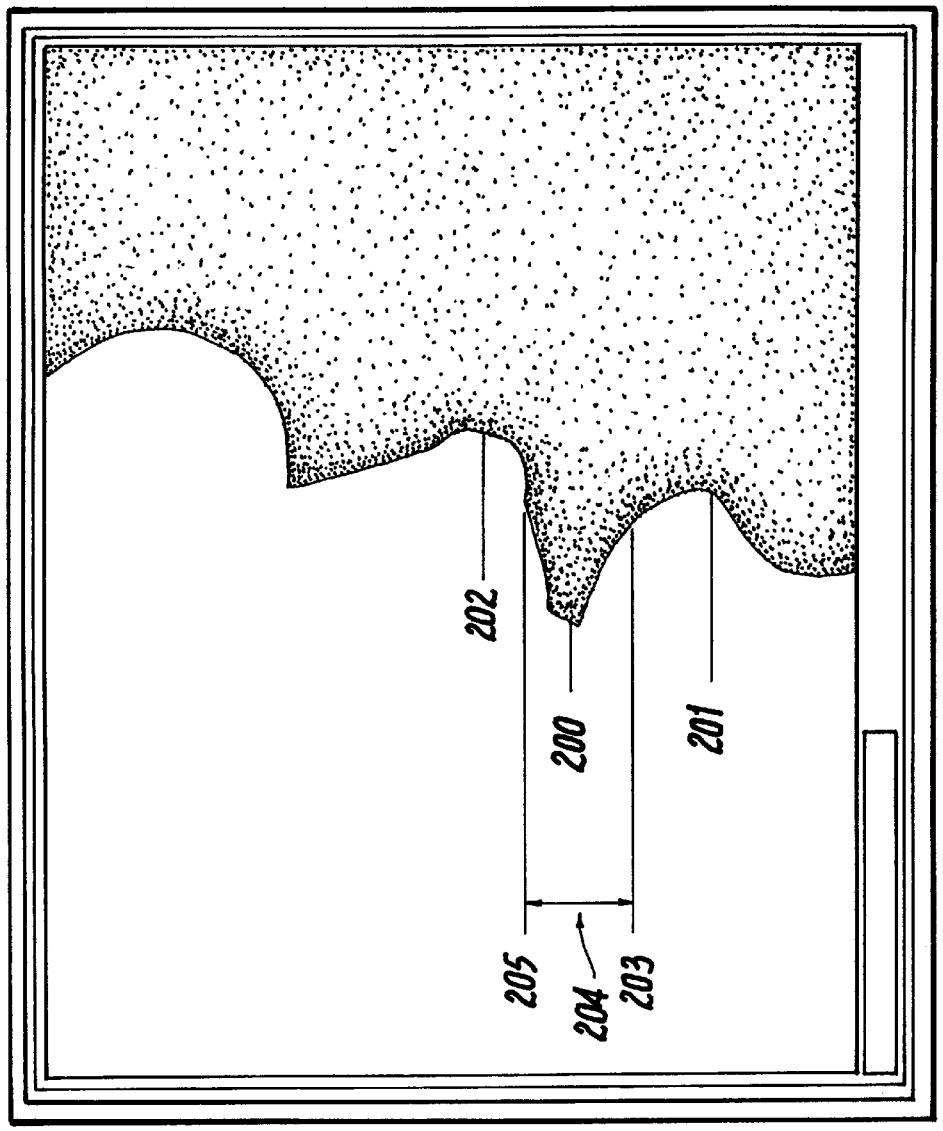
FIGS. 4–8 depict a sequence of image frames which were obtained during normal speech while uttering syllable 'ba'.
Figure 5:
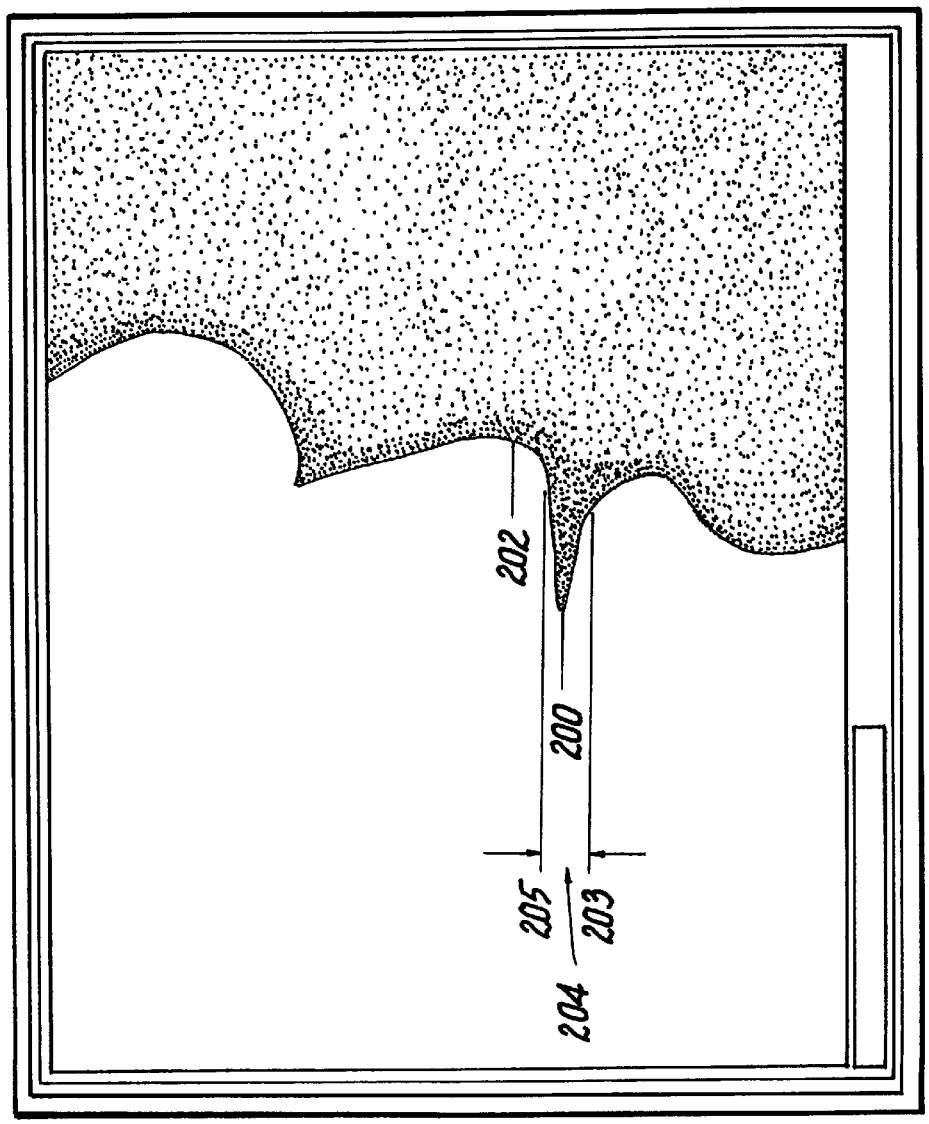
Figure 6:
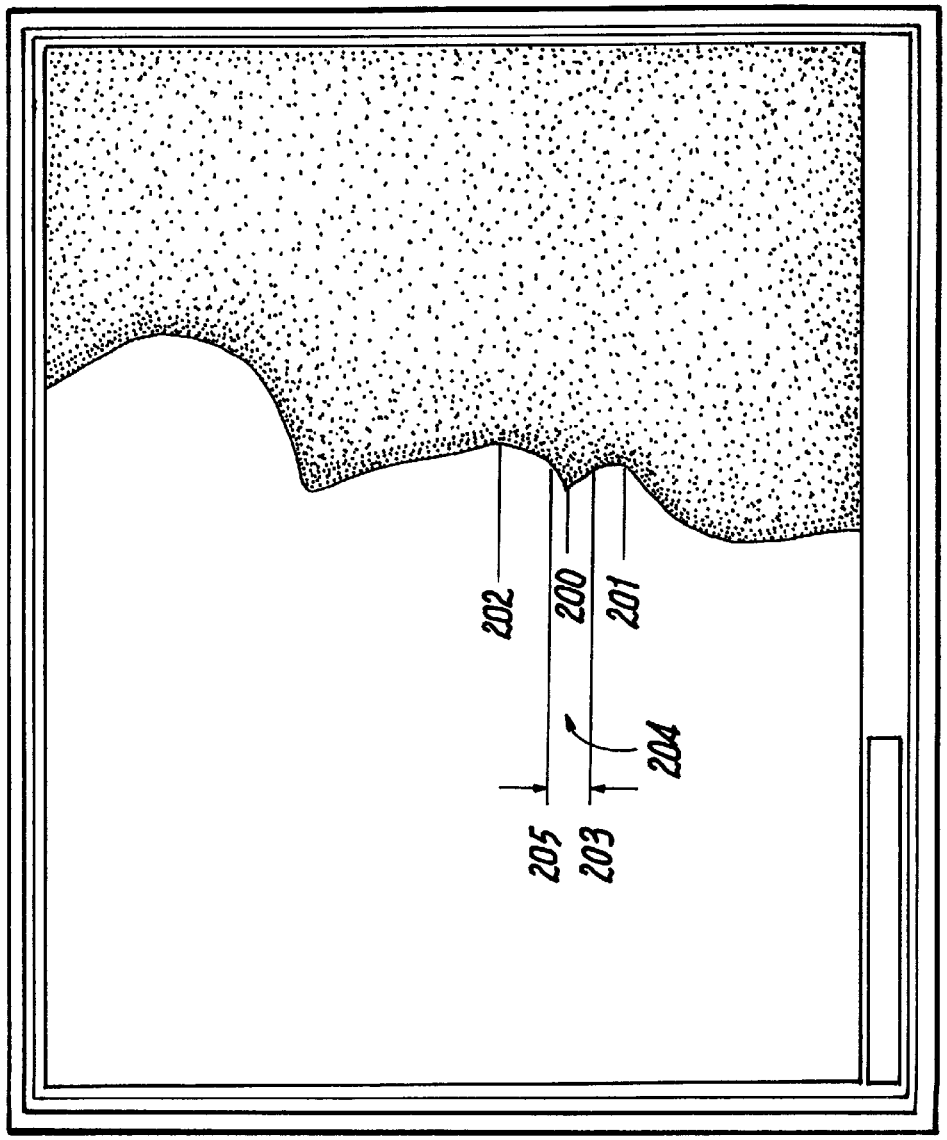
Figure 7:
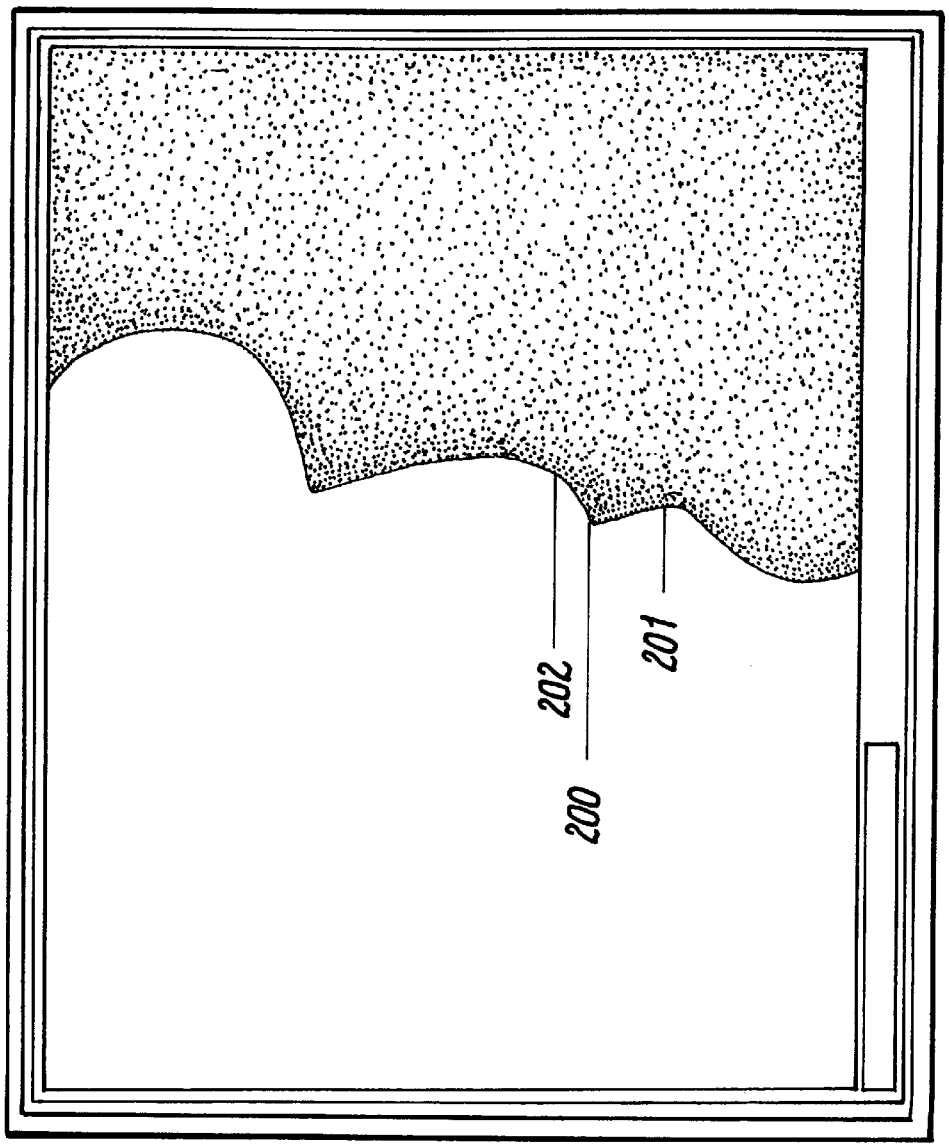
Figure 8:
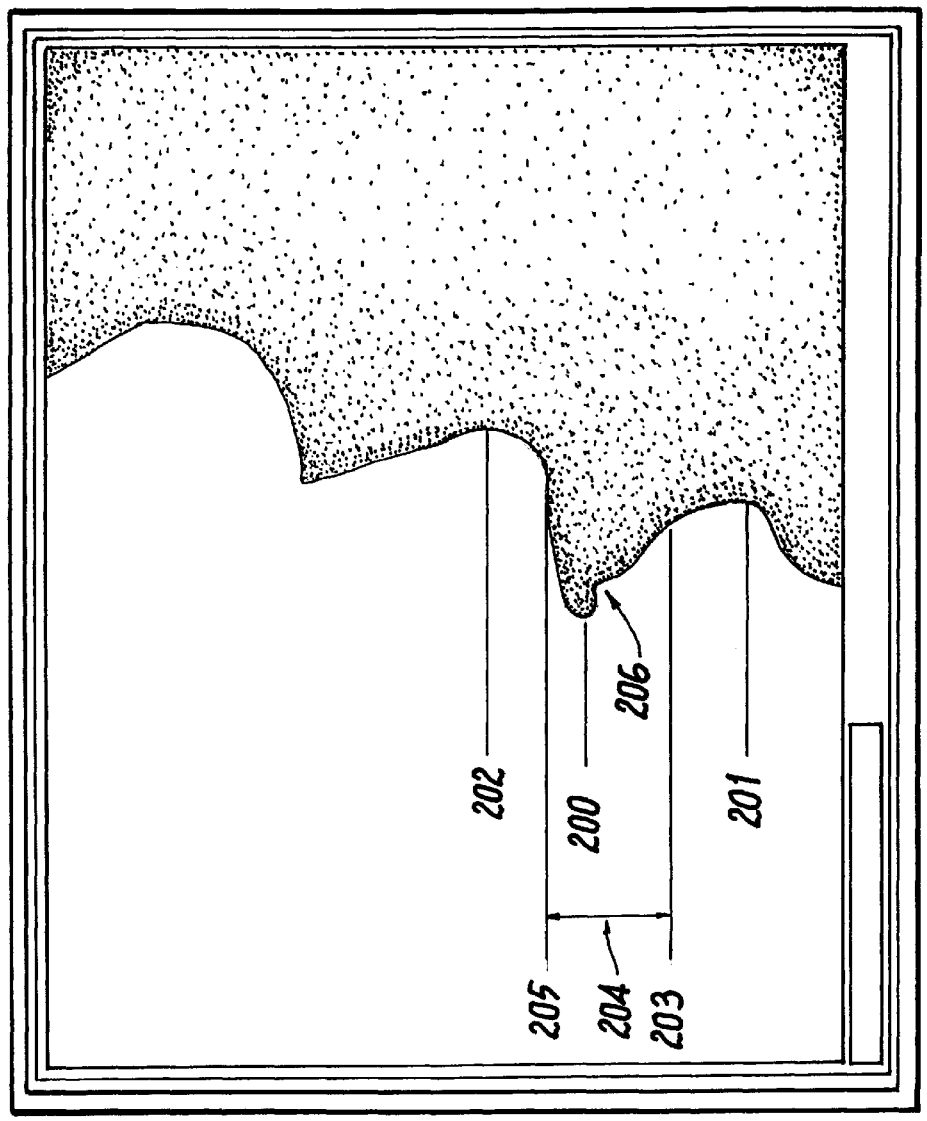

A wide range of features of the mouth image may be computed for use in recognition. The advantage of the present invention is that the extraction of features is very simple and reliable. The first step is calculation of the facial profile. The profile may easily be found by detecting the contrast between the face and the background. For example, FIG. 3 shows a typical black and white profile image after a video capture. All pixels set to black correspond to the background, and all other pixels, i.e., white correspond to the facial profile.

An example of the processing which may be applied to the input images are as follows:

1) find profile;
2) smooth profile;
3) find deepest intrusion;
4) find extremity of lower lip;
5) find extremity of upper lip;
6) find lip separation; and
7) calculate lip shape and intrusion depth.

The profile is easily extracted by scanning each row of the image from left to right and noting the location of the first transition from bright to dark. In addition, a noise filter may be included to prevent spurious detections of the first transition from background(B) to foreground(F). For example, the noise filter algorithm may reject a B-F transition if there was another F-B transition less than a few pixels after it. The filter may be useful in eliminating data noise which may have been created as a result of, e.g., non-uniform illumination or dirty mirrors. The column number at which the transition occurs is stored as one element of a vector, which is the profile. Accordingly, one element of the vector for each row in the image is stored.

Smoothing the profile may be accomplished by any linear or non-linear filter applied to the one-dimensional profile. For example, one skilled in the art can simply generate new profile values from the averages of groups of three neighboring values.

The point of deepest intrusion often depicts the location of the smallest element 200 of the profile vector. Alternatively, the initial value of the point of deepest intrusion may be set by using information from a previous image frame. For example, if the point of deepest intrusion occurred in row 350 in the previous frame, then the corresponding point the current frame is likely to be no more than a few rows away from row 350. Such method may help discriminating against possible spurious detection of the point of deepest intrusion arising from the region below the lower lip or above the upper lip.

The extremities of the lower and upper lip are found by examining profile vector elements serially starting from the point of deepest intrusion. The first maximum values encountered may be taken as the extremities of the lower 201 and upper 202 lips.

The lip separation is important in determining whether the mouth is closed at some point in time during the enunciation of a syllable. The lip separation may be computed by first finding the likely location of lip contact for the less protruding lip. For example, in FIG. 3, the lower lip 201 is less protruding than the upper lip 202. A parameter that is characteristic of the speaker, called lip thickness, is obtained during training process. An algorithm locates the likely point of lip contact 203 as the row that is one lip thickness away from the extremity of the less protruding lip. A lip separation 204 is the number of rows between this row 203 and the point of the profile vector having the same profile value 205.

A lip shape feature may be calculated as the difference in the locations of the lip extremities in the profile. The intrusion depth may be found by subtracting the value of the point of deepest intrusion from the value of the extremities of either lip, or from the value of the likely point of contact of either lip, or a combination of these values.

A possible minimum set of features from each image frame may include the lip separation, the lip shape, and the intrusion depth. These features convey useful information for differentiating between similar consonant sounds and for detecting the start and end points of syllables. Any number of other possible features obtained from the profile may also be used. For example, in FIG. 3, the speaker's lower teeth 206 are visible as a discontinuity in the profile, and in some cases the tongue may be visible (not shown). Furthermore, it is possible that other useful features may be computed directly from the input image.

FIGS. 4–8, depict a sequence of image frames obtained during normal speech of a person while uttering a syllable 'ba', including the preparation stage. Using the video camera arrangement for generating lateral view images of a speaker and the infrared light source, mouth profile precessing was performed. Table 1 lists the values of the three features, lip separation, lip shape, and depth of intrusion for the images of FIGS. 4–8.

TABLE 1

| Figure | lip separation | lip shape | intrusion depth |
|---|---|---|---|
| 3 | 58 | 139 | 104 |
| 4 | 30 | 105 | 97 |
| 5 | 0 | 70 | 23 |
| 6 | 0 | 86 | 28 |
| 7 | 65 | 156 | 97 |

The features in a profile described above clearly may be used to characterize and discriminate between the images in a sequence. Furthermore, the sequences of these features may be used to characterize and discriminate between sequences corresponding to other spoken syllables. Moreover, the processing required for features computation is minimal and therefore, may be performed in real-time on any small computer or custom board.

Figure 9:
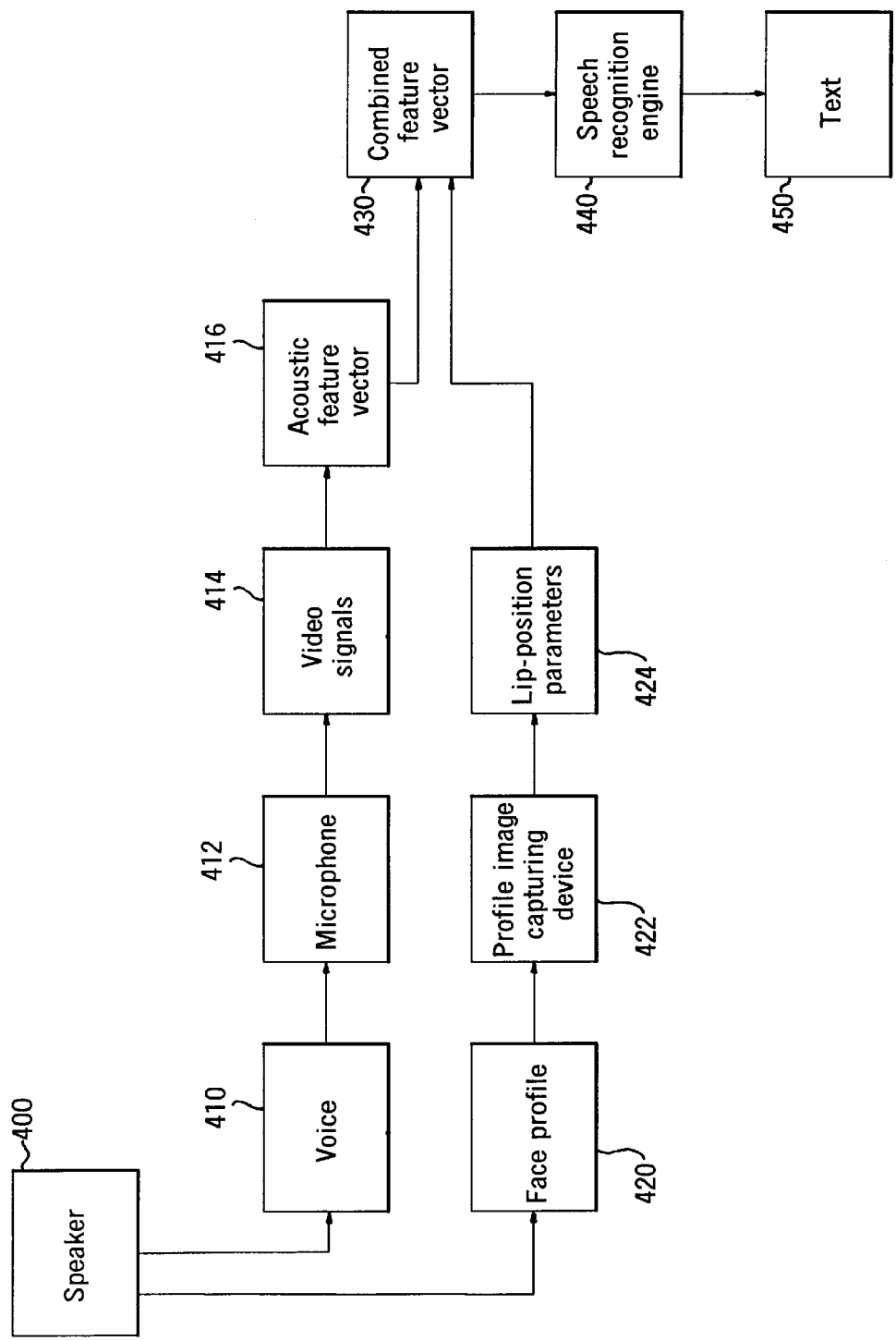
FIG. 9 illustrates a block diagram showing an application of the present invention to a speech recognition system.

Various types of machine training for automatic speech recognition using hidden Markov models (HMM) are well known as a highly successful technique among the persons skilled in the art. As a novel feature in speech recognition, the profile parameters including lip separation, lip shape, and intrusion depth computed in the present invention may be included as processing elements in the model resulting in more accurate speech recognition. For example, FIG. 9 illustrates a block diagram showing an application of the present invention to a speech recognition system. Generally, the speaker's 400 voice 410 is input to microphone 412 and converted typically by an acoustic signal processor into audio signals 414, which are quantized as an acoustic feature vector 416. At the same time, the speaker's 400 facial profile 420, typically the mouth area, is captured by a profile image capturing device 422, the apparatus of the present invention. The captured images are converted into various lip positions 424 as described previously. The acoustic and the mouth (or lip) profile features are then combined into a feature vector 430 having the combination of the acoustic and the profile features. This combined feature vector may be used as training data to a speech recognition engine 440. As described above, the speech recognition engine may be a typical acoustic speech recognition system known in the art, and more specifically, a hidden Markov model. The speech recognition engine 440 then produces the output text 450 which corresponds to the speech enunciated by the speaker 400.

While the invention has been particularly shown and described with respect to the preferred embodiments thereof, it will be understood by those skilled in the art that the foregoing and other changes in form and details may be made therein without departing from the spirit and scope of the invention.

What is claimed is:

1. An apparatus for acquiring video images and video data for use with automated acoustic speech recognition systems, comprising:

a video camera positioned to capture lateral views of a speaker's mouth area while uttering speech, the video camera capturing lateral images; and first means for computing image features from a set of only captured lateral images, wherein the computed image features are used with acoustics signals of the uttered speech for automated speech recognition.

2. The apparatus as claimed in claim 1, wherein the features computed are used as input parameters to a hidden Markov model for training the hidden Markov model to recognize speech.

3. The apparatus as claimed in claim 1, wherein the first means for computing features includes extracting means for extracting a facial profile into a one-dimensional vector by scanning each row of the captured lateral image and recording into the one-dimensional vector a column number of the row where a first transition between foreground image and background image occurs, the extracting means also smoothing the profile by applying one of linear or non-linear filter, wherein features may be calculated from the one-dimension vector.

4. The apparatus as claimed in claim 3, wherein the computed features include one feature selected from the group of lip separation, intrusion depth, lip shape, and combinations thereof.

5. The apparatus as claimed in claim 4, wherein the computed features are used for differentiating between similar consonant sounds and detecting start and end points of syllables uttered by a speaker, and which features are computed from the one-dimensional vector.

6. The apparatus as claimed in claim 1, wherein the video camera includes an infrared CCD camera.

7. The apparatus as claimed in claim 1, wherein the apparatus further includes:

at least one illuminating source positioned to illuminate the speaker's mouth area.

8. The apparatus as claimed in claim 7 wherein the illuminating source includes one or more infrared light source(s).

9. The apparatus as claimed in claim 1, wherein the apparatus further includes:

mirror means positioned to reflect the speaker's mouth area.

10. The apparatus as claimed in claim 1, wherein the apparatus further includes a headset having a microphone positioned in front of the speaker's mouth, the headset further having the video camera and a light source for illuminating the speaker's mouth area, mounted on it.

11. The apparatus as claimed in claim 10, wherein the apparatus further includes mirror means positioned next to the microphone and reflecting the speaker's mouth area.

12. The apparatus as claimed in claim 11, wherein the mirror means includes a flat mirror.

13. The apparatus as claimed in claim 12, wherein the mirror means is positioned angularly to the mouth area.

14. The apparatus as claimed in claim 13, wherein the apparatus further includes a diffuse screen, and wherein the video camera is mounted on one end of the headset, and the light source is mounted on the opposite end of the headset, the light source emitting light to the diffuse screen which diffuses the light to the speaker's mouth area, the video camera capturing the lateral view of the speaker's mouth area which is also reflected in the mirror means.

15. The apparatus as claimed in claim 14, wherein the diffuse screen includes a white paper.

16. The apparatus as claimed in claim 14, wherein the diffuse screen includes a white plastic card.

17. The apparatus as claimed in claim 13, wherein the apparatus further includes a diffuse screen mounted on one side of the headset, and wherein the video camera and the light source are mounted on opposite side of the headset and adjacent to one another, the video camera capturing the lateral view of the speaker's mouth area which is also reflected in the mirror means against a dark background created by the diffuse screen.

18. The apparatus as claimed in claim 17, wherein the light source is mounted directly adjacent to the mirror means.

19. The apparatus as claimed in claim 17, wherein the diffuse screen includes a black paper.

20. The apparatus as claimed in claim 17, wherein the diffuse screen includes a black plastic card.

21. A method of acquiring video image data for use with an automated acoustic speech recognition system, the method comprising:

capturing lateral images of a speaker's face focusing in a range of speaker's lips;

extracting speaker's profile from a set of only captured lateral images; and computing image features from the speaker's profile, wherein the computed image features are used with acoustics signals for automated speech recognition.

22. The method according to claim 21, wherein the method further comprises:

applying one of linear or non-linear filter to smooth the extracted speaker's profile before the step of computing features.

23. The method according to claim 21, wherein the extracting step comprises:

scanning each row of the captured lateral image;

noting a location of a transition to foreground from background in the captured lateral image; and storing a column number of the location into a one-dimensional vector, wherein the computed features are computed from the one-dimensional vector.

24. The method according to claim 23, wherein the extracting step further includes:

rejecting an identified transition to foreground from background if an occurrence of another transition from foreground to background is detected within a predefined pixel range of the identified transition, wherein detections of spurious transitions are filtered.

25. The method according to claim 23, wherein the computing step further includes:

computing a point of deepest intrusion by finding a smallest element in the vector;

determining intrusion depth from the point of deepest intrusion;

determining lip separation by finding a location of lip contact for a less protruding lip and counting a number of rows between the location and a point having the same vector value as the location; and calculating a lip shape feature by calculating a difference in locations of lip extremities.

26. The method according to claim 25, wherein the lip extremities are computed by examining the one-dimensional vector serially starting from the point of deepest intrusion in both directions, and finding a first maximum value encountered in a first direction in the vector as the extremity of the lower lip and finding a second maximum value encountered in an opposite direction from the first direction as the extremity of the upper lip.

27. The method according to claim 21, wherein the method further includes:

training a hidden Markov model with the computed features and acoustics signals for accurately recognizing speech.

* * * * *